United States Patent
Ji et al.

(10) Patent No.: US 10,401,674 B2
(45) Date of Patent: Sep. 3, 2019

(54) OPTICAL DEVICE COMPRISING AN ALIGNMENT LAYER HAVING A PHOTOISOMER GROUP IRRADIATED WITH LIGHT TO CHANGE A REFRACTIVE INDEX OF A LIQUID CRYSTAL LAYER AND DISPLAY APPARATUS HAVING THE SAME

(71) Applicant: BOE TECHNOLOGY GROUP CO., LTD., Beijing (CN)

(72) Inventors: Chunyan Ji, Beijing (CN); Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/573,873

(22) PCT Filed: Mar. 2, 2017

(86) PCT No.: PCT/CN2017/075474
§ 371 (c)(1),
(2) Date: Nov. 14, 2017

(87) PCT Pub. No.: WO2018/018889
PCT Pub. Date: Feb. 1, 2018

(65) Prior Publication Data
US 2018/0239214 A1      Aug. 23, 2018

(30) Foreign Application Priority Data
Jul. 26, 2016    (CN) .......................... 2016 1 0596049

(51) Int. Cl.
G02F 1/1335      (2006.01)
G02F 1/1337      (2006.01)
(Continued)

(52) U.S. Cl.
CPC ...... *G02F 1/133526* (2013.01); *G02F 1/0126* (2013.01); *G02F 1/1323* (2013.01);
(Continued)

(58) Field of Classification Search
CPC ................. G02F 1/1323; G02F 1/0126; G02F 2001/133738; G02F 2001/133769
See application file for complete search history.

(56) References Cited

U.S. PATENT DOCUMENTS 7,453,620 B2    11/2008    Nagamura et al.
7,580,186 B2     8/2009    Mather et al.
(Continued)

FOREIGN PATENT DOCUMENTS

CN    1591088 A    3/2005
CN    1842733 A    10/2006
(Continued)

OTHER PUBLICATIONS

International Search Report dated Jun. 5, 2017, issued in counterpart International Application No. PCT/CN2017/075474 (5 pages).
(Continued)

*Primary Examiner* — Paul C Lee
(74) *Attorney, Agent, or Firm* — Westerman, Hattori, Daniels & Adrian, LLP

(57) ABSTRACT

An optical device for a display panel. The optical device comprises an optical element (1). The optical element (1) may include a first surface (3) and a second surface (4) opposite the first surface, and side surfaces. The optical device may further comprise a light source (2) facing one of the side surfaces of the optical element (1). The optical element (1) may comprise a compound containing a photoisomer group. The photoisomer group may undergo a photoisomerization under an irradiation of the light source. Accordingly, an illumination area by a light passing through
(Continued)

the first surface (3) and exiting from the second surface (4) may increase or decrease.

21 Claims, 5 Drawing Sheets

(51) Int. Cl.
*G02F 1/29* (2006.01)
*G02F 1/01* (2006.01)
*G02F 1/13* (2006.01)

(52) U.S. Cl.
CPC ........ *G02F 1/133788* (2013.01); *G02F 1/293* (2013.01); *G02F 1/133711* (2013.01); *G02F 2001/133738* (2013.01); *G02F 2001/133742* (2013.01); *G02F 2001/133769* (2013.01)

(56) References Cited

U.S. PATENT DOCUMENTS

| | | | |
|---|---|---|---|
| 8,581,815 B2 | 11/2013 | Hong et al. | |
| 2006/0250541 A1* | 11/2006 | Huck | F21V 14/003 349/61 |
| 2009/0109154 A1* | 4/2009 | Hong | H04N 13/305 345/87 |
| 2013/0044280 A1* | 2/2013 | Asaoka | G02F 1/137 349/70 |
| 2015/0138454 A1* | 5/2015 | Pugh | A61F 2/1627 349/13 |

FOREIGN PATENT DOCUMENTS

| | | | | |
|---|---|---|---|---|
| CN | 101419351 A | 4/2009 | | |
| CN | 105974656 A | 9/2016 | | |
| CN | 205827015 U | 12/2016 | | |
| JP | 05019260 A | * | 1/1993 | |
| JP | 2005-92159 A | | 4/2005 | |
| JP | 2011215381 A | * | 10/2011 | G02F 1/293 |
| RO | 128436 B1 | | 4/2015 | |

OTHER PUBLICATIONS

Written Opinion of the International Searching Authority dated Jun. 5, 2017, issued in counterpart International Application No. PCT/CN2017/075474 (4 pages).

* cited by examiner

OPTICAL DEVICE COMPRISING AN ALIGNMENT LAYER HAVING A PHOTOISOMER GROUP IRRADIATED WITH LIGHT TO CHANGE A REFRACTIVE INDEX OF A LIQUID CRYSTAL LAYER AND DISPLAY APPARATUS HAVING THE SAME

CROSS-REFERENCE TO RELATED APPLICATIONS

This application claims the benefit of the filing date of Chinese Patent Application No. 201610596049.7 filed on Jul. 26, 2016 the disclosure of which is hereby incorporated by reference.

TECHNICAL FIELD

This invention relates to display technology, more particularly to an optical device, display apparatus and driving method thereof.

BACKGROUND

As consumer electronics are frequently used in public places, privacy leaks are becoming an inevitable problem. To meet the needs of privacy protection, some anti-peeping technologies have been developed, such as anti-peeping polymeric membranes. However, with these methods, when a user needs to increase the viewing field, it is difficult to switch the consumer electronics to the original state of the viewing.

BRIEF SUMMARY

Accordingly, one example of the present invention is an optical device comprising an optical element. The optical element may include a first surface and a second surface opposite the first surface, and side surfaces adjacent to the first surface and the second surface. The optical device may further comprise a light source facing one of the side surfaces of the optical element. The optical element may be configured to adjust a light passing through the first surface and exiting from the second surface to increase or decrease an illumination area under an irradiation of the light source. The optical element may comprise a compound containing a photoisomer group. The photoisomer group may photoisomerize under the irradiation of the light source. Accordingly, an illumination area by a light passing through the first surface and exiting from the second surface may increase or decrease.

In one embodiment, the optical element may further comprise a first substrate and a second substrate. An optical film layer may be disposed between the first substrate and the second substrate. An alignment layer may be disposed between the first substrate and the second substrate. The first surface may be a surface of the first substrate opposite to the second substrate, and the second surface may be a surface of the second substrate opposite to the first substrate. The alignment layer may comprise a polymer having a photoisomer group.

The optical element may further comprise a liquid crystal layer disposed between the optical film layer and the alignment layer. The liquid crystal layer may comprise liquid crystal molecules, and the photoisomer group may be located on a surface of the alignment layer adjacent to the liquid crystal layer. The photoisomer group may photoisomerize under the irradiation of the light source.

When the light source is turned on, the optical element adjusts the light incident passing through the first surface and exiting from the second surface to increase or decrease an illumination area.

When the light source is turned off, the alignment layer aligns the liquid crystal molecules at a direction parallel to the first substrate and the second substrate. A refractive index of the liquid crystal layer and a refractive index of the optical film layer may be the same. Accordingly, an illumination area by a light incident passing through the first surface and exiting from the second surface does not change.

Under the irradiation of the light source, the photoisomer group may undergo a photoisomerization. The alignment layer may be configured to align the liquid crystal molecules in a direction perpendicular to the first substrate and the second substrate. The refractive index of the liquid crystal layer can be greater than the refractive index of the optical film layer. Accordingly, an illumination area by the light passing through the first surface and exiting from the second surface may increase or decrease.

The interface between the optical film layer and the liquid crystal layer may include a convex surface toward the second surface. The entire interface may be the convex surface. Alternatively, the interface between the optical film layer and the liquid crystal layer may include a concave surface toward the first surface. The entire interface may be the concave surface.

The optical film layer may be disposed on the second substrate, and the alignment layer may be disposed on the first substrate.

In another embodiment, the optical element may comprise an optically deformable film, which may be made of a photo-deformable material. The photo-deformable material may comprise liquid crystal molecules having a photoisomer group. A photoisomerization of the photoisomer group may cause light-induced deformation of the photo-deformable material.

Under the irradiation of the light source, the optically deformable film may be configured to deform to form a lens structure through which the light incident on the first surface passes and exits from the second surface. An illumination area by the light passing through the first surface and exiting from the second surface may be increased or decreased.

The photo-deformable material may further comprise a polyether polyol (PEP) or polycarbonate (PC). A weight ratio of the liquid crystal molecules in the photo-deformable material may be within a range from approximately 70% to 80%. The photo-deformable material may be a liquid crystal elastomer. The liquid crystal molecules may be oriented in a horizontal direction, the horizontal direction being parallel to the first surface and the second surface.

The photoisomer group may be an azo group.

The light source may be an ultraviolet light source. The optical device may further comprise a light absorbing layer disposed adjacent to the second surface for absorbing ultraviolet light in the light exiting from the second surface.

The photo-deforming material may further comprise a rare earth up-conversion material, and the light source may be a near-infrared light source.

The photo-deformable material may be an expandable ceramic having the photoisomer group.

A display device comprising a display panel may comprise the optical device according to one embodiment of the present invention, which may be provided on a display side of the display panel. The optical element may include an alignment layer made of a polymer having a photoisomer group. When the light source is turned off, the alignment layer may align liquid crystal molecules in a first direction perpendicular to a direction of polarization of linearly polarized light emerging from the display panel. The direction of polarization is in a horizontal plane with respect to the first direction, and the horizontal plane is parallel to the display panel.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
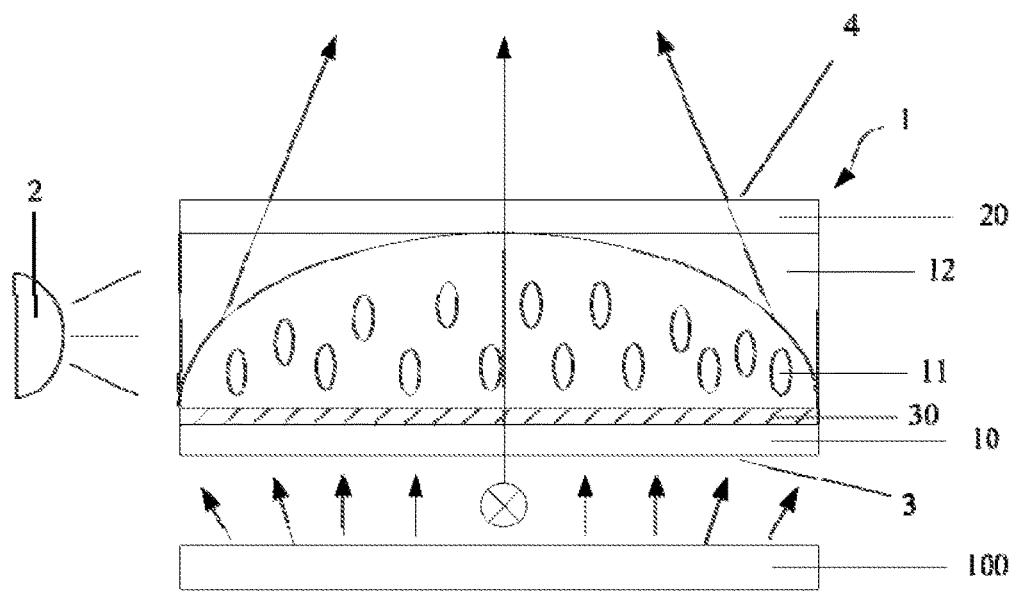
FIG. 1 shows a schematic diagram of an operational optical device when the light source is turned on in accordance with one embodiment of the present invention.

The present invention is described with reference to embodiments of the invention. Throughout the description of the invention reference is made to FIGS. 1-9. When referring to the figures, like structures and elements shown throughout are indicated with like reference numerals.

When an anti-peeping function is desired, it is necessary to reduce the display angle of the display device. However, when the anti-peeping is not desired, the display angle of the display device should be increased. Therefore, there is an urgent need to provide a display device capable of switching the size of the viewing angle to improve the user experience.

One example of the present invention is an optical device for a display panel. In one embodiment, the optical device comprises a light source and an optically controllable optical element. The optical element comprises a first surface and a second surface opposite the first surface, and side surfaces adjacent to the first and the second surfaces. A light may be incident on the first surface and exit from the second surface. A light source may be disposed on a side of the optical element. When the light source is turned off, the optical element does not adjust the light incident on the first surface. When the light source is turned on, the optical element adjusts the light incident on the first surface, and accordingly, increases or decreases an illumination area.

The optical device may be disposed on a display side of the display panel (i.e., the display panel is disposed close to the first surface). Accordingly, it is possible to achieve the purpose of increasing or decreasing the viewing angle with high sensitivity and high switching speed using a light control.

Embodiment I

Figure 2:
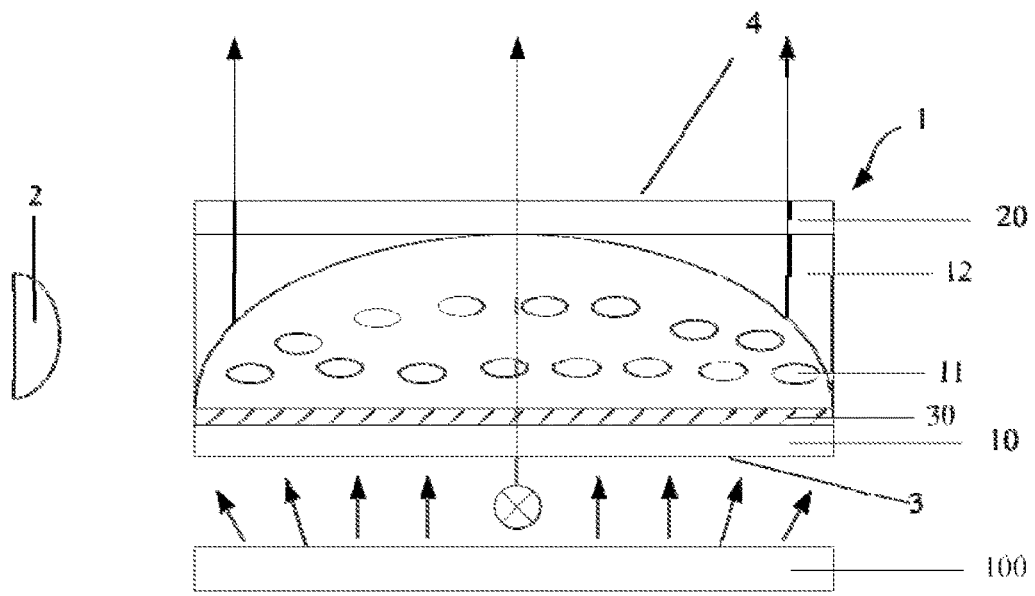
FIG. 2 shows a schematic diagram of an operational optical device when the light source is turned off in accordance with one embodiment of the present invention.
Figure 3:
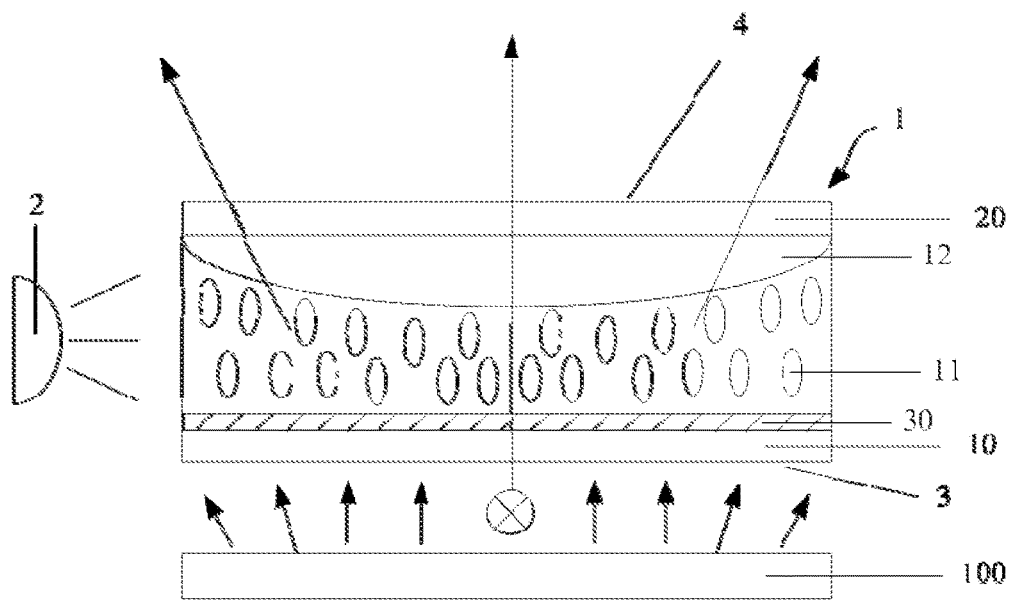
FIG. 3 shows a schematic diagram of an operational optical device when the light source is turned on in accordance with one embodiment of the present invention.
Figure 4:
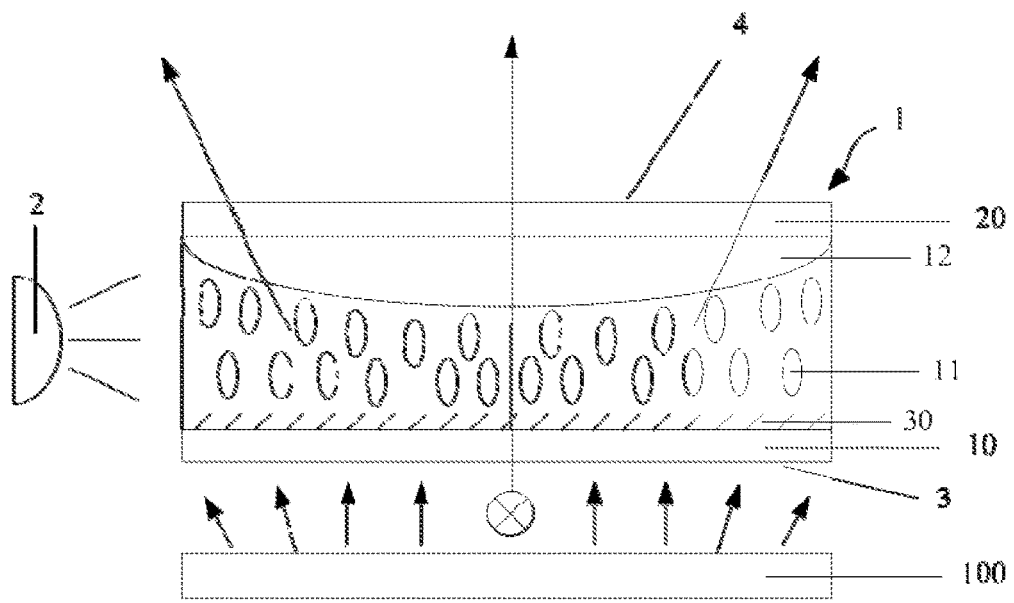
FIG. 4 shows a schematic diagram of an operational optical device when the light source is turned off in accordance with one embodiment of the present invention.

As shown in FIGS. 1 to 4, an optical device in accordance with one embodiment of the present invention comprises a light-controllable optical element 1 and a light source 2. The optical element 1 comprises a first surface 3 and a second surface 4 opposite the first surface 3, and side surfaces adjacent to the first and second surfaces. A light incident on the first surface 3 is emitted from the second surface 4. The light source 2 is provided at a side of the optical element 1. When the light source 2 is turned off, the optical element 1 does not adjust the light incident on the first surface 3, as shown in FIGS. 2 and 4. When the light source 2 is turned on, the optical element 1 adjusts the light incident on the first surface 3 and exiting from the second surface 4 to increase the illumination area (as shown in FIG. 3) or reduce the illumination area (as shown in FIG. 1) under the irradiation of the light source 2. Herein the illumination area refers to an illumination area observed and compared at a constant distance from the second surface 4.

The optical element 1 may include a first substrate 10 and a second substrate 20. The first surface 3 may be a surface of the first substrate 10 opposite to the second substrate 20, and the second surface 4 may be a surface of the second substrate 20 opposite to the first substrate 10. The optical element 1 may be disposed on a display side of a display panel 100. A polarized light emitted from the display panel 100 may be incident on the optical element 1 through the first surface 3 and emitted from the second surface 4.

The optical element 1 may further include an optical film layer 12 disposed between the first substrate 10 and the second substrate 20, an alignment layer 30 disposed between the first substrate 10 and the second substrate 20, and a liquid crystal layer 11 between the optical film layer 12 and the alignment layer 30. The alignment layer 30 may be made of a polymer having a photoisomer group. The photoisomer group may be located on a surface of the alignment layer 30 adjacent to the liquid crystal layer 11. When the light source 2 is turned off, the alignment layer 30 aligns liquid crystal molecules in a direction parallel to the first substrate 10 and the second substrate 20 so that the refractive index of the liquid crystal layer 11 and the refractive index of the optical film layer 12 is the same. The illumination area by the light incident on the first surface 3 passing through the liquid crystal layer 11 and the optical film layer 12 may be unchanged. Furthermore, the alignment direction of the liquid crystal molecules may be perpendicular to the polarization direction of the polarized light emitted from the display panel 100, (the direction of major axis of elliptical circles in FIGS. 1-4 represents the polarization direction of the polarized light).

When the light source 2 is turned on, the photoisomer group undergoes photoisomerization. Then, the alignment layer 30 aligns the liquid crystal molecules along the direction perpendicular to the first substrate 10 and the second substrate 20 such that the refractive index of the liquid crystal layer 11 may be greater than the refractive index of the optical film layer 12. The illumination area by the light incident on the first surface 3 passing through the liquid crystal layer 11 and the optical film layer 12 can be decreased or increased, as shown in FIG. 1 and FIG. 3 respectively.

The optical element 1 may be formed as the following. Specifically, an optical film layer 12 is placed on a second substrate 20. An alignment layer 30 is placed on a first substrate 10. Then, after the first substrate 10 and the second substrate 20 are placed together to form a cell and sealed, liquid crystals are filled between the first substrate 10 and the second substrate 20 to form a liquid crystal layer 11. It should be noted that the configuration of the optical element in the present embodiment is not limited to this.

The optical film layer 12 may be formed by curing isotropic polymerizable monomers under UV light. The optical film layer 12 may have a single refractive index. The direction of the light exiting from the second surface 4 is changed mainly because the light source changes the structure and accordingly the refractive index of the liquid crystal layer 11. The direction of the light exiting from the second surface 4 is mainly controlled by the difference of the refractive indexes at the interface between the optical film layer and the liquid crystal layer.

The light source 2 may be an LED light source, which has advantages of small size, low power consumption, long life, high brightness, low heat and so on. A lens may also be provided at the top of the emitting end of the LED to provide a collimated light source. The photoisomer group may be an azo group. When the light source 2 is turned on, the azo group may undergo cis-trans isomerization and the orientation of the liquid crystal molecules may be changed so that the alignment layer 30 aligns liquid crystal molecules in a direction perpendicular to the orientation of the first substrate 10 and the second substrate 20.

The photoisomer group may be a triphenylmethane group. A polymer gel containing a colorless triphenylmethane derivative in a pendant group may expand under irradiation with ultraviolet light. Under the ultraviolet light, the triphenylmethane group may ionize in a solvent to form a pair of ions so that an osmotic pressure of the solvent in the gel increases. Accordingly, the gel may swell further and a weight of the gel can be increased more than 13 times. When the UV irradiation is removed, the ion pair is coupled. Accordingly, the gel contracts and can be restored to the initial state.

The photoisomer group may be a benzospiropyran group. Polarity of molecular chains of the polymers containing a benzospiropyran group may increase under irradiation of light. Accordingly, the polymer-polymer interaction and the polymer-solvent interaction may change significantly to shrink the material.

Furthermore, the liquid crystal phase can undergo photoisomerization, and exhibit anisotropy to isotropic phase transition under the light. Accordingly, the liquid crystal phase can contract and change its size correspondingly.

A lens can be used to converge or diverge the light, thereby improving the effect of changing the display angle. Specifically, a convex lens may be used to gather light to more effectively reduce the viewing angle. In another embodiment, a concave lens may be used to diverge light to more effectively increase the viewing angle.

As shown in FIGS. 1 and 2, the interface between the optical film layer 12 and the liquid crystal layer 11 may include a convex surface toward the second surface 4, which is a surface of the second substrate 20 opposite to the first substrate 10. When the light source 2 is turned on, the photoisomerization occurs, and the alignment layer 30 aligns the liquid crystal molecules in a direction perpendicular to the first substrate 10 and the second substrate 20, so that the refractive index of the liquid crystal layer 11 may be larger than that of the optical film layer 12. Accordingly, a convex lens structure may be formed at the convex surface, and light may be converged to more effectively reduce the viewing angle, as shown in FIG. 1. When the light source 2 is turned off, the alignment layer 30 aligns the liquid crystal molecules in the direction parallel to the first substrate 10 and the second substrate 20 so that the refractive index of the liquid crystal layer 11 and the refractive index of the optical film layer 12 are the same. Accordingly, the illumination area of the light incident from the first surface 3 passing through the liquid crystal layer 11 and the optical film layer 12 is unchanged, wherein the first surface 3 is a surface of the first substrate 10 opposite to the second substrate 20, as shown in FIG. 2. Preferably, the interface between the optical film layer 12 and the liquid crystal layer 11 is entirely a convex surface toward the second surface. A convex lens structure may be formed over the entire interface.

In another embodiment, as shown in FIGS. 3 and 4, the interface between the optical film layer 12 and the liquid crystal layer 11 may include a concave surface that is convex toward the first surface, which is a surface of the first substrate 10 opposite to the second substrate 20. When the light source 2 is turned on, the photoisomerization occurs, and the alignment layer 30 aligns the liquid crystal molecules in a direction perpendicular to the first substrate 10 and the second substrate 20, so that the refractive index of the liquid crystal layer 11 may be larger than that of the optical film layer 12. Accordingly, a concave lens structure may be formed at the concave surface, and light may be diverged to more effectively increase the viewing angle, as shown in FIG. 3. When the light source 2 is turned off, the alignment layer 30 aligns the liquid crystal molecules in the direction parallel to the first substrate 10 and the second substrate 20 so that the refractive index of the liquid crystal layer 11 and the refractive index of the optical film layer 12 may be the same. Accordingly, the illumination area of the light incident on the first surface 3 passing through the liquid crystal layer 11 and the optical film layer 12 is unchanged, as shown in FIG. 4.

In the embodiments described above, a lens structure is used to increase the effect of changing the viewing angle of the display. In one embodiment, the first substrate 10 and the second substrate 20 may form a sealed box. The optical film layer 12 may be disposed on the second substrate 20, and the alignment layer 30 may be disposed on the first substrate 10, wherein the optical film layer 12 and the alignment layer 30 may be located between the first substrate 10 and the second substrate 20. A liquid crystal layer 11 may be filled between the optical film layer 12 and the alignment layer 30. The photoisomer group of the alignment layer 30 may be located on the surface of the alignment layer 30 near the liquid crystal layer 11. The interface between the optical film layer 12 and the liquid crystal layer 11 may be convex toward the second surface or concave toward the first surface so that the interface between the optical film layer 12 and the liquid crystal layer 11 may include a convex surface toward the second surface or a concave surface toward the first surface. The interface between the optical film layer 12 and the alignment layer 30 may have other shapes such as a bevel surface or a folding surface.

For the optical device as shown in FIGS. 1 and 2, in order to prevent peeping, the light source 2 is turned on to reduce the display angle of the display device. The light source 2 is turned off when the viewing angle of the display device is to be increased. For the optical device as shown in FIGS. 3 and 4, the light source 2 is turned on when the display viewing angle needs to be increased. When the anti-peeping is required, the light source 2 is turned off. Therefore, the increase or decrease of the viewing angle is only a relative concept. When the light source 2 is turned on, the display viewing angle is increased (or decreased) relative to that when the light source 2 is turned off.

In one embodiment, the alignment layer 30 is made of a polymer having photoisomer groups located on a surface of the alignment layer 30 adjacent to the liquid crystal layer 11 so that the structural state of the photoisomer can be changed, thereby aligning the liquid crystal molecules at different directions. When the liquid crystal molecules are oriented such that the refractive indices of the liquid crystal layer 11 and the optical film layer 12 are different, the optical element 1 can adjust the transmitted light, specifically diverging (or converging) the light to increase (or decrease) the illumination area, thereby achieving the purpose of switching the size of the display angle.

When the optical device of the present invention is applied to the display device, the light emitted from the display panel 100 may be adjusted by the optical element 1 so that the viewing angle can be increased or decreased. In one embodiment, in order to prevent the light emitted from the display panel 100 from interfering with the structural state of the photoisomer group, it may be arranged that the photoisomer group undergoes photoisomerization under the irradiation of invisible light rays, that is, the light emitted from the light source 2 is invisible light, such as an ultraviolet light source, a near ultraviolet light source, or a near infrared light source. In one embodiment, an inducing agent may be doped into the polymer having a photoisomer group to induce photoisomerization of the photoisomer group. For example, the rare-earth up-conversion material (such as $NaYF_4$) may be doped into the polymer with azo groups, so that the rare-earth up-conversion luminescent particles may emit light to induce the cis-trans isomerization of the azo group under near-infrared light irradiation.

In one embodiment, the azo group may be located in a side chain or main chain of the polymer. Preferably, the azo group may be located in the side chain of the polymer, and the effect of orienting the liquid crystal molecules may be better.

When the light emitted by the light source 2 is invisible light, the optical device may be further provided with a light absorbing layer 40 (FIG. 9) provided close to the second surface of the optical element 1 for absorbing invisible light of the light emitted from the second surface to prevent harm to the user.

In one embodiment, the alignment layer may be made of a polymer having photoisomer groups, and the illumination area may be increased or decreased by the photoisomerization of the photoisomer groups to change the alignment of the liquid crystal molecules.

In one embodiment, in order to ensure the alignment effect of the alignment layer on the liquid crystal layer, a light source may be provided on both sides of the optical element so that the photoisomer groups of the entire alignment layer undergoes photoisomerization, and accordingly, the alignment layer aligns all the liquid crystal molecules in the liquid crystal layer.

Embodiment II

In another embodiment of the present invention, the light may be adjusted by photo-deformation of an optical film, thereby increasing or decreasing the illumination area to switch the size of the viewing angle.

Figure 5:
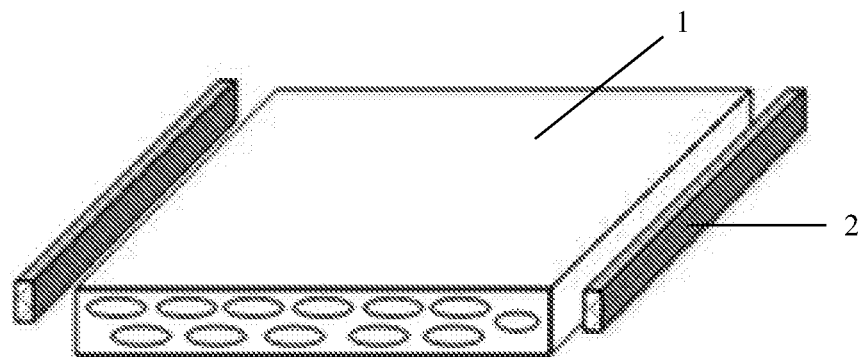
FIG. 5 shows a schematic diagram of an operational optical device when the light source is turned off in accordance with one embodiment of the present invention.
Figure 6:
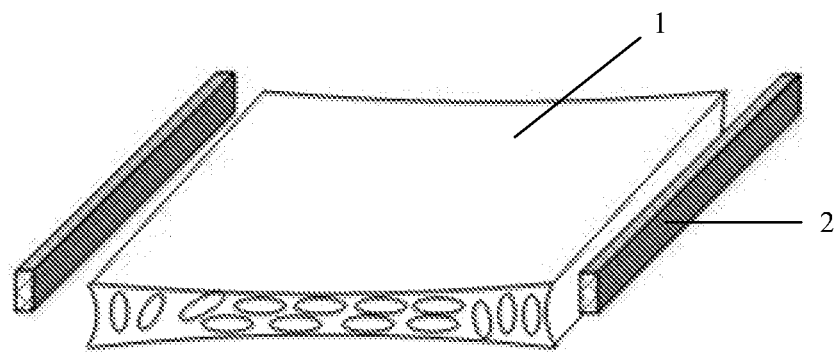
FIG. 6 shows a schematic diagram of an operational optical device when the light source is opened in accordance with one embodiment of the present invention.
Figure 7:
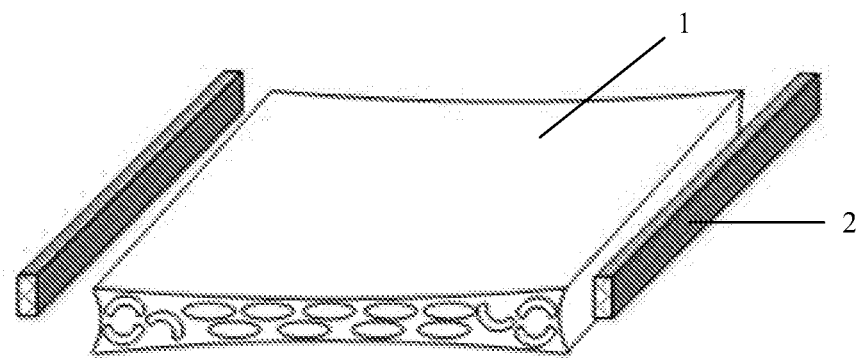
FIG. 7 shows a schematic diagram of an operational optical device when the light source is opened in accordance with one embodiment of the present invention.

As shown in FIGS. 5 to 8, the optical element 1 is an optically deformable film comprising a first surface 3 and a second surface 4 opposite the first surface 3, and side surfaces adjacent to the first and second surfaces. The light source 2 is disposed near the side surface. The optically deformable film 1 is made of a photo-deformable material. When the light source 2 is turned off, the optically deformable film 1 is not deformed, and the light incident from the first surface is not be adjusted as shown in FIG. 5. When the light source 2 is turned on, the photo-deformable material may deform, and the optically deformable film 1 may be deformed to form a lens structure. Accordingly, the illumination area of the light incident from the first surface passing through the optically deformable film 1 may increase or decrease, as shown in FIG. 6 and FIG. 7.

A light source 2 may be provided on each of the opposite first and second side surfaces of the optical element 1. When the light source 2 is turned on, the amount of deformation of the first portion of the optical element 1 near the first side and the amount of deformation of the second portion near the second side may be symmetrically distributed along the center of the optical element 1 to form a central convex or concave lens structure. The center of the lens structure may correspond to the center position of the display panel when applied to the display device. The light source 2 may be provided on both the opposite first and second side surfaces of the optical element 1.

Figure 8:
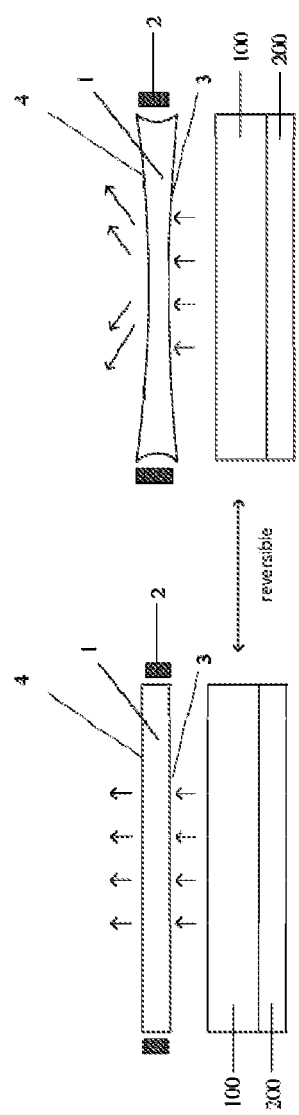
FIG. 8 shows the operation of an optical device in accordance with one embodiment of the present invention.

The photo-deformable material for the optically deformable film 1 may comprise a liquid crystal molecule having a photoisomer group, which changes the orientation of the liquid crystal molecules by a change in the structural state of the photoisomer group, thereby photo-deforming the optically deformable film 1 to form a lens structure. Without being held to a particular theory, it is believed this is due to when the light source 2 is turned on, near the light source 2, the photoisomer group of the liquid crystal molecule undergoes photoisomerization, so that the liquid crystal molecules are deflected by 90° and are changed from the horizontal orientation to the vertical orientation (as shown in FIG. 6). At a distance from the light source 2, since the liquid crystal molecules are irradiated with a smaller amount of light and have a smaller deflection angle, the liquid crystal molecules accordingly tend to be horizontally oriented. The edge of the optically deformable film 1 may thus be arched and the intermediate portion may collapse. The optically deformable film 1 may be macroscopically expressed as a concave lens structure. Accordingly, the transmitted light may be diffused to increase the illuminated area. When the light source 2 is turned off, the photoisomer group may be restored to the original structural state, and all the liquid crystal molecules may be oriented horizontally, and the transmitted light may not be adjusted, and the illumination area may be unchanged, as shown in FIG. 8. Similarly, it is also possible to set the liquid crystal molecules to be vertically oriented in the absence of light. When the light source is turned on, the liquid crystal molecules near the light source may be deflected by 90°, changed from the vertical orientation to the horizontal orientation. For the liquid crystal molecules far away from the light source, due to being irradiated with a smaller amount of light, the deflection angle is smaller, and those molecules tend to have vertical orientation. Accordingly, the edges of the optical film are relatively collapsed, and the middle is relatively arched. Macroscopically, a convex lens structure may be formed, thereby converging the transmitted light to reduce the illuminated area, which is not illustrated in the drawings.

The photoisomer group may be located in a main chain or a side chain of the liquid crystal molecule. Preferably, the photoisomer group may be located in the side chain of the liquid crystal molecule, as such, the orientation effect on the liquid crystal molecules may be better.

In one embodiment, in order to facilitate the production of optically deformable film 1, liquid crystal molecules having photoisomerization groups may be mixed with polyether polyol (PEP), polycarbonate (PC) or other materials, then an optical film 1 may be formed by a film formation process. The weight ratio of the liquid crystal molecules in the photo-deformable material may be from approximately 70% to 80%.

In one embodiment, the photoisomerization of the optically deformable film 1 may be performed by forming the photoisomer group on the liquid crystal molecule, and the orientation of the liquid crystal molecule may be changed by photoisomerization of the photoisomer groups to form a lens structure. The liquid crystal molecules may be non-crosslinked liquid crystal polymers.

In another embodiment, the photo-deformable material for preparing the optically deformable film 1 may be a liquid crystalline elastomer having a photoisomer group or an expandable ceramic having a photoisomer group. The liquid crystal elastomer having a photoisomer group may be preferred because the response of the liquid crystal elastomer to the light is sharp. The size and shape thereof may be changed accordingly and elasticity may be generated in the event of photo-induced deformation.

The liquid crystal elastomer may be a moderate crosslinked liquid crystal polymer. Liquid crystal elastomers have dual properties of liquid crystal and elastomers (order, mobility and elasticity). The most important characteristic of liquid crystalline elastomers is the orientation effect under a mechanical force field compared with non-crosslinked liquid crystalline polymers. Only 20% of the strain may be sufficient to obtain a uniform alignment of the liquid crystal domains (FIG. 5). The photoisomer group may be added to a side chain or backbone of the liquid crystalline elastomer.

Assuming the liquid crystal elastomer having the photoisomer group is oriented horizontally in the absence of light, when the light source 2 is turned on, the photo-induced isomerisation may be reversible cis-trans isomerisation. The molecular length may be changed from trans 0.9 nm to cis 0.55 nm. Through the synergic interactions between the molecules and/or molecular chains, the liquid crystal elastomer near the light source 2 may undergo large bending deformation after light irradiation, so that the macroscopic appearance may be that the edge of the optical film 1 may be arched and the theoretical deformation value can reach 400%. The middle portion far away from the light source 2 may deform the least, so that the middle portion of the optical film may be relatively collapsed. Accordingly, the optically deformable film 1 may form a concave lens structure. The transmitted light may be diffused by the optically deformable film 1 to increase the illuminated area. When the light source 2 is turned off, the photoisomer group may restore the original structural state, the liquid crystal elastomer may be horizontally oriented. Accordingly, the optically deformable film 1 is not deformed, and the transmitted light is not adjusted, as shown in FIG. 8.

When the liquid crystalline elastomer having a photoisomer group is vertically oriented in the absence of light, when the light source 2 is turned on, the cis-trans isomerism of the photoisomer group may lead to the relative collapse of the edge of the optically deformable film 1. The optically deformable film 1 may then be formed into a convex lens structure capable of diffusing the transmitted light and reducing the illumination area. The specific principle is similar to that described above.

In one embodiment, when the optical device is applied to a display device, the optical element 1 may be disposed on a display side of the display panel 100. A polarized light emitted from the display panel 100 may be incident on the optical element 1 via the first surface. After being adjusted in the optical element 1, the polarized light may be emitted from the second surface 4, thereby increasing or decreasing the viewing angle. In order to prevent the light emitted from the display panel 100 from interfering with the structural state of the photoisomer group, it may be arranged that the photoisomer group may undergo optical isomerization under irradiation of invisible light, that is, the light emitted by the light source 2 is invisible light, such as an ultraviolet light source, a near ultraviolet light source, or a near infrared light source. In another embodiment, an inducing agent may be doped into the polymer having a photoisomer group to induce photoisomerization of the photoisomer group. For example, a rare-earth up-conversion material (such as NaYF4) may be doped in the polymer having an azo group, so that the rare-earth up-conversion luminescent particles may emit light to induce the azo group to trans-cis-isomerism under the near-infrared light irradiation. When the light emitted by the light source 2 is invisible light, the optical device may be further provided with a light absorbing layer 40 (FIG. 9) provided close to the second surface of the optical element 1 for absorbing the invisible light in the light emitted from the second surface to prevent harm to the user. For example, when the light source 2 is an ultraviolet light source, the light absorbing layer 40 serves to absorb the ultraviolet light in the light emitted from the second surface.

It should be noted that the optical device in the above embodiments may be applied to the display panel. The so-called "direct-type backlight" in the relevant art is relative to the display module, and the optical devices in accordance with embodiments of the present invention can adjust the size of the illumination area of the light emitted from the display panel. That is, the optical device may be a separate device relative to the display panel, and the light exiting the display panel may be incident on the first surface of the optical device.

Embodiment III

Figure 9:
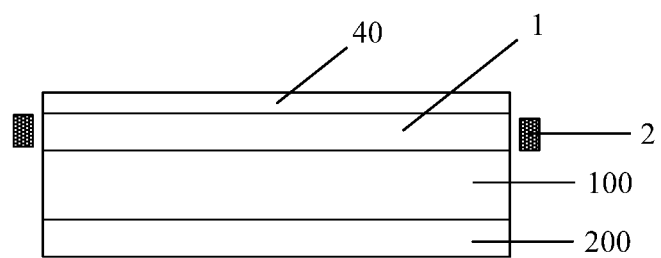
FIG. 9 shows a configuration of a display device in accordance with one embodiment of the present invention.

As shown in FIG. 9, there is provided a display device including a display panel 100 and an optical device provided on a display side of the display panel 100. The optical device may be the optical device in accordance with Embodiment 1 or Embodiment 2 of the present invention. Such optically controllable optical device may quickly switch the size of the display viewing angle, thereby helping to achieve anti-peeping and improving the user experience.

In one embodiment, the controllable optical element of the optical device comprises an alignment layer made of a polymer having a photoisomer group. When the light source of the optical device is turned off, the alignment layer aligns the liquid crystal molecules in a first direction, the first direction being perpendicular to the polarization direction of a linearly polarized light exiting from the display panel, the polarization direction being in a horizontal plane with the first direction, and the horizontal plane being parallel to the display panel. When the light source is turned on, the alignment layer aligns the liquid crystal molecules in a second direction perpendicular to the display panel. The display device may be a liquid crystal display device, an OLED display device, or other type of display device.

In another embodiment, there is also provided a driving method of the display device. The driving method comprises turning on or turning off the light source of the optical device to change the viewing angle of the display device.

The driving method may automatically control and switch the size of the viewing angle. The light source of the optical device may be automatically controlled to turn on or off according to environmental parameters, such as ambient noise. In one embodiment, when the ambient noise is not less than a pre-set value, indicating that the user is in a public place, the light source may be controlled to turn on or turn off to reduce the viewing angle of the display device. When the ambient noise is less than a preset value, indicating that the user is in privacy, the light source of the optical device may be controllably turned on or turned off to increase the viewing angle of the display device.

In one embodiment, a button or human-computer interaction interface may be provided through which the user controls the turning on or turning off the light source of the optical device to improve the user experience.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical device, comprising:
    an optical element including a first surface and a second surface opposite the first surface, and side surfaces adjacent to the first and the second surfaces,
    a light source facing one of the side surfaces of the optical element,
    wherein the optical element is configured to adjust a light passing through the first surface and exiting from the second surface to increase or decrease an illumination area under an irradiation of the light source,
    the optical element comprises a compound containing a photoisomer group, and the photoisomer group photoisomerizes under the irradiation of the light source,
    the optical element further comprises:
    a first substrate and a second substrate,
    an optical film layer between the first substrate and the second substrate,
    an alignment layer between the first substrate and the second substrate,
    wherein the first surface is a surface of the first substrate opposite to the second substrate, the second surface is a surface of the second substrate opposite to the first substrate, and the alignment layer comprises a polymer having the photoisomer group, and
    under the irradiation of the light source, the photoisomer group photoisomerizes, the alignment layer is configured to align liquid crystal molecules of a liquid crystal layer in a direction perpendicular to the first substrate and the second substrate, so that the refractive index of the liquid crystal layer is greater than the refractive index of the optical film layer, and the illumination area by the light passing through the first surface and exiting from the second surface increases or decreases.

2. The optical device according to claim 1, wherein the liquid crystal layer is disposed between the optical film layer and the alignment layer, and
    the photoisomer group being located on a surface of the alignment layer adjacent the liquid crystal layer.

3. The optical device according to claim 1, wherein an interface between the optical film layer and the liquid crystal layer includes a convex surface toward the second surface.

4. The optical device according to claim 3, wherein the interface is entirely the convex surface.

5. The optical device according to claim 1, wherein an interface between the optical film layer and the liquid crystal layer includes a concave surface toward the first surface.

6. The optical device according to claim 5, wherein the interface is entirely the concave surface.

7. The optical device according to claim 1, wherein the optical film layer is disposed on the second substrate, and the alignment layer is disposed on the first substrate.

8. The optical device according to claim 1, wherein the optical element comprises an optically deformable film, wherein the optically deformable film is made of a photo-deformable material.

9. The optical device according to claim 8, wherein under the irradiation of the light source, the optically deformable film is configured to deform to form a lens structure, and the illumination area by the light passing through the first surface and exiting from the second surface is increased or decreased.

10. The optical device according to claim 8, wherein the photo-deformable material comprises liquid crystal molecules having the photoisomer group, wherein a photoisomerization of the photoisomer group is configured to cause light-induced deformation of the photo-deformable material.

11. The optical device according to claim 8, wherein the photo-deformable material further comprises a polyether polyol or a polycarbonate.

12. The optical device according to claim 10, wherein a weight ratio of the liquid crystal molecules in the photo-deformable material is within a range from approximately 70% to 80%.

13. The optical device according to claim 8, wherein the photo-deformable material is a liquid crystal elastomer.

14. The optical device according to claim 10, wherein the liquid crystal molecules are oriented in a horizontal direction, the horizontal direction being parallel to the first surface and the second surface.

15. The optical device according to claim 1, wherein the photoisomer group is an azo group.

16. The optical device according to claim 1, wherein the light source is an ultraviolet light source.

17. The optical device according to claim 16, wherein the optical device further comprises a light absorbing layer adjacent to the second surface for absorbing ultraviolet light in the light exiting from the second surface.

18. The optical device according to claim 8, wherein the photo-deformable material further comprises a rare earth up-conversion material, and the light source is a near-infrared light source.

19. The optical device according to claim 8, wherein the photo-deformable material is an expandable ceramic having the photoisomer group.

20. A display device comprising a display panel, further comprising the optical device according to claim 1 provided on a display side of the display panel.

21. The display device according to claim 20, wherein the optical element includes an alignment layer made of a polymer having the photoisomer group, and the alignment layer is configured to align liquid crystal molecules in a first direction perpendicular to a direction of polarization of linearly polarized light emerging from the display panel when the light source is turned off, the direction of polarization being in a horizontal plane with respect to the first direction, the horizontal plane being parallel to the display panel.

* * * * *